United States Patent
Guo et al.

(10) Patent No.: US 11,787,962 B2
(45) Date of Patent: Oct. 17, 2023

(54) INKJET INK FOR TEXTILE PRINTING

(71) Applicant: Hewlett-Packard Development Company, L.P., Spring, TX (US)

(72) Inventors: Dennis Z. Guo, San Diego, CA (US); Jie Zheng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 452 days.

(21) Appl. No.: 17/268,044

(22) PCT Filed: Dec. 21, 2018

(86) PCT No.: PCT/US2018/067244
§ 371 (c)(1),
(2) Date: Feb. 11, 2021

(87) PCT Pub. No.: WO2020/131115
PCT Pub. Date: Jun. 25, 2020

(65) Prior Publication Data
US 2021/0198506 A1 Jul. 1, 2021

(51) Int. Cl.
*C09D 11/322* (2014.01)
*B41J 2/05* (2006.01)
(Continued)

(52) U.S. Cl.
CPC .............. *C09D 11/322* (2013.01); *B41J 2/05* (2013.01); *B41M 5/0023* (2013.01); *B41M 5/0047* (2013.01); *B41M 7/009* (2013.01); *C09D 11/033* (2013.01); *C09D 11/037* (2013.01); *C09D 11/102* (2013.01); *D06P 1/5285* (2013.01); *D06P 5/2077* (2013.01); *D06P 5/30* (2013.01); *D06P 3/04* (2013.01);
(Continued)

(58) Field of Classification Search
CPC ... C09D 11/322; C09D 11/033; C09D 11/037; C09D 11/102; C09D 175/06; B41J 2/05; B41M 5/0023; B41M 5/0047; B41M 7/009; D06P 1/5285; D06P 5/2077; D06P 5/30; D06P 3/04; D06P 3/24; D06P 3/52; D06P 3/60; D06P 1/54; D06P 1/6493; D06P 1/44
See application file for complete search history.

(56) References Cited

U.S. PATENT DOCUMENTS 5,929,188 A 7/1999 Nakamura et al.
7,425,062 B2 * 9/2008 Bauer .................... G01D 11/00
347/100
(Continued)

FOREIGN PATENT DOCUMENTS

JP 2017149812 A 8/2017
WO WO-2005049744 6/2005
(Continued)

*Primary Examiner* — Bradley W Thies
(74) *Attorney, Agent, or Firm* — Dierker & Kavanaugh, P.C.

(57) ABSTRACT

An example of an inkjet ink for textile printing includes a polycarbodiimide, a pigment, a sulfonated polyester-polyurethane binder, and a liquid vehicle. Examples of the inkjet ink may be used in textile printing kits and printing methods with a textile fabric. Examples of the textile fabric may be selected from the group consisting of cotton, polyester, nylon, and silk.

15 Claims, 1 Drawing Sheet

(51) Int. Cl.
   *B41M 5/00*       (2006.01)
   *B41M 7/00*       (2006.01)
   *C09D 11/033*     (2014.01)
   *C09D 11/037*     (2014.01)
   *C09D 11/102*     (2014.01)
   *D06P 1/52*       (2006.01)
   *D06P 5/20*       (2006.01)
   *D06P 5/30*       (2006.01)
   *D06P 3/04*       (2006.01)
   *D06P 3/24*       (2006.01)
   *D06P 3/52*       (2006.01)
   *D06P 3/60*       (2006.01)

(52) U.S. Cl.
   CPC .................. *D06P 3/24* (2013.01); *D06P 3/52* (2013.01); *D06P 3/60* (2013.01)

(56) References Cited

U.S. PATENT DOCUMENTS

| | | |
|---|---|---|
| 2004/0214490 A1 | 10/2004 | Kreider et al. |
| 2006/0098066 A1 | 5/2006 | Bauer |
| 2007/0104874 A1 | 5/2007 | Ogawa et al. |
| 2013/0337185 A1 | 12/2013 | Transvalidou et al. |
| 2018/0094380 A1 | 4/2018 | Yagi |

FOREIGN PATENT DOCUMENTS

| | | |
|---|---|---|
| WO | WO-2005113692 | 12/2005 |
| WO | WO-2010114899 A1 | 10/2010 |
| WO | WO-2012030546 | 3/2012 |

* cited by examiner

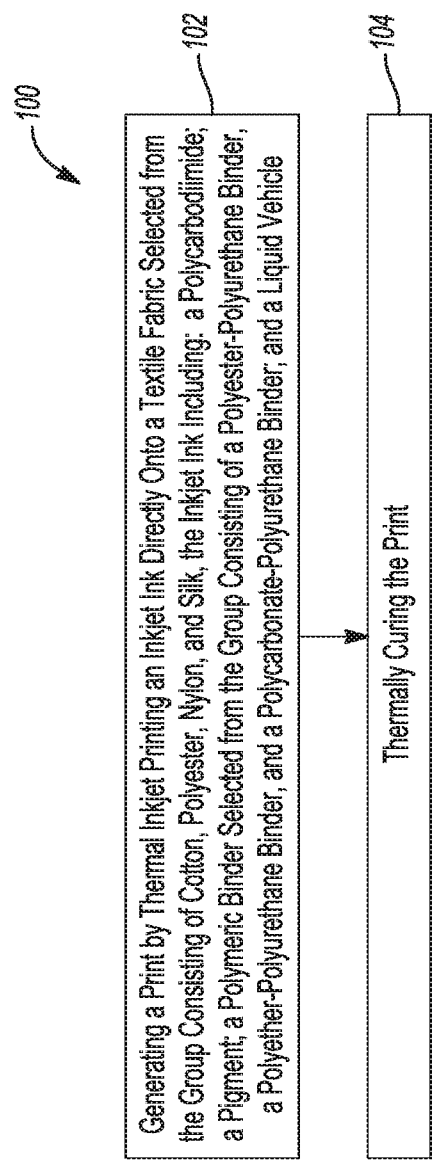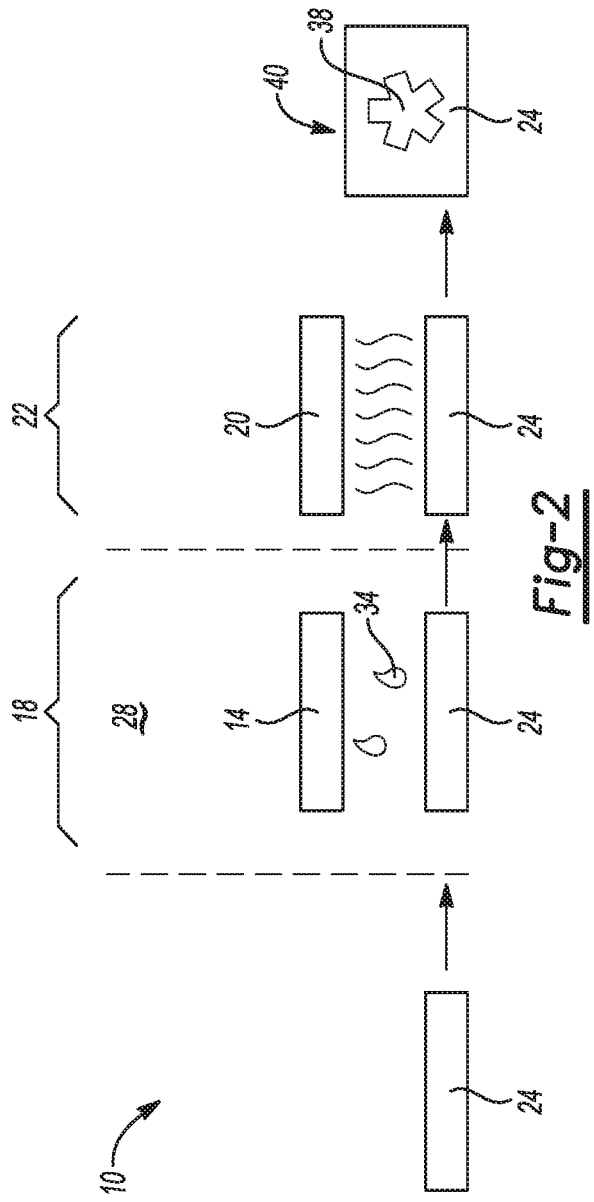

INKJET INK FOR TEXTILE PRINTING

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers are gaining acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings.

FIG. 1 is a flow diagram illustrating an example of a printing method; and

FIG. 2 is a schematic diagram of an example of a printing system.

DETAILED DESCRIPTION

The textile market is a major industry, and printing on textiles, such as cotton, polyester, etc., has been evolving to include digital printing methods. However, the vast majority of textile printing 95%) is still performed by analog methods, such as screen printing. Multi-color printing with analog screen printing involves the use of a separate screen for each color that is to be included in the print, and each color is applied separately (with its corresponding screen). In contrast, digital inkjet printing can generate many colors by mixing basic colors in desired locations on the textile, and thus avoids the limitations of analog screen printing.

Disclosed herein is an inkjet ink that is suitable for digital inkjet printing on a variety of textile fabrics, including cotton and polyester and cotton blends. The inkjet ink disclosed herein includes a polycarbodiimide, a pigment, a polymeric binder selected from the group consisting of a polyester-polyurethane binder, a polyether-polyurethane binder, and a polycarbonate-polyurethane binder, and a liquid vehicle. The inkjet ink is water-based, and can be formulated for printing via thermal or piezoelectric inkjet printers. It has been found that the inkjet ink, when inkjet printed on the textile fabric, generates prints having a desirable optical density and washfastness, regardless of the textile fabric used. Without being bound to any theory, it is believed that the polycarbodiimide improves durability by crosslinking among binder molecules and between the binder molecules and the fabric after curing.

"Washfastness," as used herein, refers to the ability of a print on a fabric to retain its color after being exposed to washing. Washfastness can be measured in terms of $\Delta E$. The term "$\Delta E$," as used herein, refers to the change in the $L*a*b*$ values of a color (e.g., cyan, magenta, yellow, black, red, green, blue, white) after washing. $\Delta E$ can be calculated by different equations, such as the CIEDE1976 color-difference formula and the CIEDE2000 color-difference formula, both of which are set forth in the Examples section herein.

Moreover, the polycarbodiimide disclosed herein is non-reactive with the other inkjet ink components. As such, the inkjet ink is stable. Stability performance can be measured in terms of physical stability. The term "physical stability," as referred to herein, means the ability of the pigment particles in the inkjet ink to remain substantially unchanged over time. To determine the physical stability of an ink, the change in particle size may be measured over time, and the percentage of size change may be determined. The particle size may be considered to be "substantially unchanged over time" when the percentage of size increase is 10% or less.

To facilitate the measurement of the particle size percentage change, the ink formulations may be stored in an accelerated storage (AS) environment. The particle size may be measured before and after the ink formulations have been stored in the accelerated storage environment. The accelerated storage environment may be an environment that has a temperature ranging from about 45° C. to about 60° C. In an example, the accelerated storage environment is an oven baked at a temperature of about 60° C. and the ink formulations are stored in the accelerated storage environment for about one week.

An additional way to facilitate the measurement of the particle size percentage change is to subject the ink formulations to a freeze-thaw or Temperature-cycle (T-cycle) condition. A T-cycle test may indicate an instability in the ink formulations that is not indicated by an accelerated storage environment test. Conversely, an accelerated storage environment test may indicate an instability in the ink formulations that is not indicated by a T-cycle test. A stable ink formulation should be able to pass both an AS environment test and a T-cycle test. When conducting a T-cycle test, the particle size may be measured before and after the ink formulations have undergone the T-cycle. The T-cycle may involve heating the ink formulation to a high temperature and maintaining the ink formulation at the high temperature for a few hours, and then cooling the ink formulation to a low temperature and maintaining the ink formulation at the low temperature for a few hours. The process may be repeated for a number of cycles (e.g., 5).

A large particle size increase can lead to a short shelf life of the ink formulation. As one example, a large particle size increase may result from phase separation in the bulk ink (e.g., pigments separating from the vehicle, agglomerating with one another, and/or settling), which would cause the ink to be unusable. Further, a large particle size increase may accelerate pigment settlement due to gravity and the increased mass of the particles (as compared to the mass of the particle before the size increase). A large particle size increase may also alter the jettability performance and/or the image quality performance. Pigment agglomeration and/or settling may render the ink more difficult to jet.

Stability performance can also be measured in terms of pH stability, viscosity stability, and surface tension stability. The term "pH stability," as referred to herein, means the ability of the ink to maintain a substantially unchanged pH over time (e.g., within ±0.5 of the original pH). The term "viscosity stability," as referred to herein, means the ability of the ink to maintain a substantially unchanged viscosity over time (e.g., when percentage of viscosity increase is 10% or less). The term "surface tension stability," as referred to herein, means the ability of the ink to maintain a substantially unchanged surface tension over time (e.g., when percentage of surface tension increase is 10% or less). The measurement of the pH change, the viscosity percentage change, and/or the surface tension percentage change may be facilitated using an AS environment test and/or a T-cycle test.

The inkjet ink may include different components with different acid numbers. As used herein, the term "acid number" refers to the mass of potassium hydroxide (KOH) in milligrams that is used to neutralize one (1) gram of a particular substance. The test for determining the acid number of a particular substance may vary, depending on the substance. For example, to determine the acid number of the polymeric binder, and in particular, a sulfonated polyester-polyurethane binder, a known amount of a sample of the binder may be dispersed in water and the aqueous dispersion may be titrated with a polyelectrolyte titrant of a known concentration. In this example, a current detector for colloidal charge measurement may be used. An example of a current detector is the Mütek PCD-05 Smart Particle Charge Detector (available from BTG). The current detector measures colloidal substances in an aqueous sample by detecting the streaming potential as the sample is titrated with the polyelectrolyte titrant to the point of zero charge. An example of a suitable polyelectrolyte titrant is poly(diallyldimethylammonium chloride) (i.e., PolyDADMAC). It is to be understood that any suitable test for a particular component may be used.

Throughout this disclosure, a weight percentage that is referred to as "wt % active" refers to the loading of an active component of a dispersion or other formulation that is present in the inkjet ink. For example, the pigment may be present in a water-based formulation (e.g., a stock solution or dispersion) before being incorporated into the inkjet ink. In this example, the wt % actives of the pigment accounts for the loading (as a weight percent) of the pigment that is present in the inkjet ink, and does not account for the weight of the other components (e.g., water, etc.) that are present in the formulation with the pigment. The term "wt %," without the term actives, refers to either i) the loading (in the inkjet ink) of a 100% active component that does not include other non-active components therein, or the loading (in the inkjet ink) of a material or component that is used "as is" and thus the wt % accounts for both active and non-active components.

Inkjet Inks

Examples of the inkjet ink disclosed herein will now be described. As mentioned above, the inkjet ink, when inkjet printed on the textile fabric, generates prints having a desirable optical density and washfastness. As also mentioned above, the inkjet ink is stable.

In some examples, the inkjet ink for textile printing comprises: a polycarbodiimide; a pigment; a polymeric binder selected from the group consisting of a polyester-polyurethane binder, a polyether-polyurethane binder, and a polycarbonate-polyurethane binder; and a liquid vehicle. In some of these examples, the inkjet ink consists of these components with no other components. In other examples, the inkjet ink may include additional components.

Polycarbodiimides

Poly(carbodiimide) is characterized as an oligomer or a polymer that includes two or more carbodiimide (—N=C=N—) functional groups. Because the poly(carbodiimide) molecule contains several —N=C=N— functional groups, one poly(carbodiimide) oligomer or polymer can react with functional groups (e.g., carboxylic groups) on different polymer chains of the binder particles, thereby chemically bonding them together. This contributed to the improved durability and washfastness. In some examples, the poly(carbodiimide) molecule may include additional functional groups that have a reactivity towards other functional groups in the textile fabric. This additional coupling can further improve the durability and washfastness. Curing at high temperature accelerates the crosslinking reactions. An example of one reaction that may be taking place is between carbodiimide functional groups of the poly(carbodiimide) molecule and carboxylic functional groups on different polymer chains of the binder. This example is shown in Scheme 1:

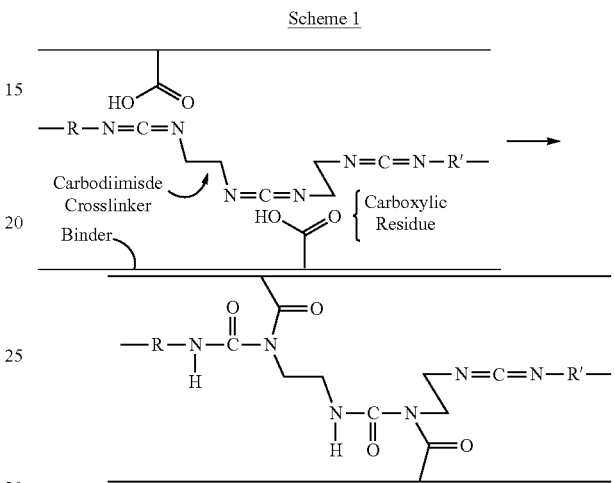

Scheme 1

In the examples disclosed herein, the polycarbodiimide may be any non-ionic or anionic polycarbodiimide. As mentioned above, the polycarbodiimide may have two or more carbodiimide groups.

In some examples of the inkjet ink, the polycarbodiimide has a weight average molecular weight ranging from 1,500 Mw to 150,000 Mw. Any weight average molecular weight referenced herein is in Daltons or g/mol. In other examples, the polycarbodiimide has a weight average molecular weight ranging from 2,000 Mw to 100,000 Mw, or from 5,000 Mw to 75,000 Mw.

In some examples, the poly(carbodiimide) is a water soluble polymer containing carbodiimide groups. The water soluble polymer containing carbodiimide groups may be present in an aqueous-based solution. A commercially available example of such an aqueous based solution is CARBODILITE® SV-02 (a 40% active poly(carbodiimide) solution, where the chemical formula weight for 1 mole of carbodiimide group is 430 grams), from Nisshinbo Industries. In other examples, the poly(carbodiimide) is a water miscible (e.g., dispersible) polymer containing carbodiimide groups. The water miscible polymer containing carbodiimide groups may be present in an aqueous-based dispersion. Commercially available examples of such aqueous based dispersions include PICASSIAN® XL-702 (a hydrophilic aqueous poly(carbodiimide), 40% active) and PICASSIAN® XL-732 (a hydrophobic aqueous poly(carbodiimide) (40% active), both from Stahl Polymers.

In one example, the poly(carbodiimide) may be formed by reacting a polyisocyanate in the presence of a carbodiimide catalyst to form a stable polycarbodiimide; terminating and/or chain extending the polycarbodiimide chain by the addition of a compound containing a hydrophilic group and one or more amine and/or hydroxyl functions during or after the polycarbodiimide formation; and dispersing the resulting compound in water, wherein the pH is adjusted to a value between 9 and 14 by the addition of a base and/or a buffer to the water. In this example, any carbodiimide catalyst may be used, such as 1-methylphospholene-1-oxide. Also in this example, any polyisocyanate may be used, such as toluene-2,4-diisocyanate, toluene-2,6-diisocyanate, diphenylmethane-4,4-diisocyanate, 1,4-phenylenediisocyanate, dicyclohexylmethane-4,4'-diisocyanate, 3-isocyanatomethyl-3,5,5-trimethylcyclohexylisocyanate, 1,6-hexyldiisocyanate, 1,4-cyclohexyl-diisocyanate, norbonyldiisocyanate diisocyanate, or a mixture thereof. Also in this example, the compound containing a hydrophilic group and one or more amine and/or hydroxyl functions is a polyethoxy mono- or diol, a polyethoxy/polypropoxy mono- or diol, a polyethoxy mono- or diamine, a polyethoxy/polypropoxy mono- or diamine, a diol or diamine with a polyalkoxy side chain, a hydroxyl- or amine alkylsulfonate, or a dialkylaminoalkyl-alcohol or amine, or a mixture thereof.

In another example, the poly(carbodiimide) is a decarbonated condensate of one or more diisocyanates selected from the group consisting of hexamethylene diisocyanate (HDI), hydrogenated xylylene diisocyanate (H$_6$ XDI), xylylene diisocyanate (XDI), 2,2,4-trimethyl-hexamethylene diisocyanate (TMHDI), 1,12-diisocyanato-dodecane (DDI), norbornane diisocyanate (NBDI) and 2,4-bis-(8-isocyanatooctyl)-1,3-dioctyl cyclobutane (OCDI).

In still another example, the poly(carbodiimide) has the structure:

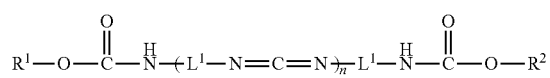

wherein R$^1$ represents a group represented by formula (a):

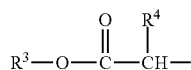

wherein R$^3$ represents a C1 to C3 alkyl group, and R$^4$ represents a hydrogen atom or a C1 to C3 alkyl group);
wherein R$^2$ represents a group represented by formula (a) (above) or (b):

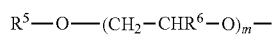

wherein R$^5$ represents a C1 to C4 alkyl group, R$^6$ represents a hydrogen atom or a methyl group, and m is an integer of 4 to 30;
wherein n is an integer of 1 to 15;
wherein L$^1$ represents a C1 to C18 divalent aliphatic hydrocarbon group, a C3 to C13 divalent alicyclic hydrocarbon group, a C6 to C14 divalent aromatic hydrocarbon group, or a C3 to C12 divalent heterocyclic group, and a plurality of L1s may be identical to or different from one another.

Some other examples of commercially available polycarbodiimides include DESMODUR® XP 2802 (40 wt % polycarbodiimide available from Covestro), CARBODILITE® E05 (41.3 wt %, polycarbodiimide available from Nisshinbo Chemical Inc.), and VERSATEX™ Fixer (20 wt % polycarbodiimide available from Jacquard Products).

In some examples of the inkjet ink, the polycarbodiimide is present in an amount ranging from about 0.1 wt % active to about 10 wt % active, based on a total weight of the inkjet ink. In other examples, the polycarbodiimide may be present in an amount ranging from about 0.1 wt % active to about 7 wt % active, from about 0.1 wt % active to about 4 wt % active, from about 0.5 wt % active to about 3 wt % active, from about 1 wt % active to about 3 wt % active, or from about 1.5 wt % active to about 2.5 wt % active, based on the total weight of the inkjet ink. In still another example, the polycarbodiimide is present in an amount of about 2 wt % active, based on the total weight of the inkjet ink.

Pigments

The pigment may be incorporated into the inkjet ink as a pigment dispersion. The pigment dispersion may include a pigment and a separate dispersant, or may include a self-dispersed pigment.

For the pigment dispersions disclosed herein, it is to be understood that the pigment and separate dispersant or the self-dispersed pigment (prior to being incorporated into the ink formulation), may be dispersed in water alone or in combination with an additional water soluble or water miscible co-solvent, such as 2-pyrrolidone, 1-(2-hydroxyethyl)-2-pyrrolidone, glycerol, 2-methyl-1,3-propanediol, 1,2-butane diol, diethylene glycol, triethylene glycol, tetraethylene glycol, or a combination thereof. It is to be understood however, that the liquid components of the pigment dispersion become part of the liquid vehicle in the inkjet ink.

Whether separately dispersed or self-dispersed, the pigment can be any of a number of primary or secondary colors, or black or white. As specific examples, the pigment may be any color, including, as examples, a cyan pigment, a magenta pigment, a yellow pigment, a black pigment, a violet pigment, a green pigment, a brown pigment, an orange pigment, a purple pigment, a white pigment, or combinations thereof.

Pigments and Separate Dispersants

Examples of the inkjet ink may include a pigment that is not self-dispersing and a separate dispersant. Examples of these pigments, as well as suitable dispersants for these pigments will now be described.

Examples of suitable blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I.

Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50. Any quinacridone pigment or a co-crystal of quinacridone pigments may be used for magenta inks.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, C.I. Pigment Yellow 180, C.I. Pigment Yellow 185, and C.I. Pigment Yellow 213.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, BLACK PEARLS® series, the MOGUL® series, or the MONARCH® series manufactured by Cabot Corporation, Boston, Mass., (such as, e.g., REGAL® 400R, REGAL® 330R, REGAL® 660R, BLACK PEARLS® 700, BLACK PEARLS® 800, BLACK PEARLS® 880, BLACK PEARLS® 1100, BLACK PEARLS® 4350, BLACK PEARLS® 4750, MOGUL® E, MOGUL® L, and ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® 75, PRINTEX® 80, PRINTEX® 85, PRINTEX® 90, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 64, C.I. Pigment Orange 66, C.I. Pigment Orange 71, and C.I. Pigment Orange 73.

The average particle size of the pigments may range anywhere from about 20 nm to about 200 nm. In an example, the average particle size ranges from about 80 nm to about 150 nm.

Any of the pigments mentioned herein can be dispersed by a separate dispersant, such as a styrene (meth)acrylate dispersant, or another dispersant suitable for keeping the pigment suspended in the liquid vehicle. For example, the dispersant can be any dispersing (meth)acrylate polymer, or other type of polymer, such as maleic polymer or a dispersant with aromatic groups and a poly(ethylene oxide) chain.

In one example, (meth)acrylate polymer can be a styrene-acrylic type dispersant polymer, as it can promote π-stacking between the aromatic ring of the dispersant and various types of pigments, such as copper phthalocyanine pigments, for example. In this example, the inkjet ink further comprises a styrene acrylic polymeric dispersant. In one example, the styrene-acrylic dispersant can have a weight average molecular weight ($M_w$) ranging from about 2,000 to about 30,000. In another example, the styrene-acrylic dispersant can have a weight average molecular weight ranging from about 8,000 to about 28,000, from about 12,000 to about 25,000, from about 15,000 to about 25,000, from about 15,000 to about 20,000, or about 17,000. Regarding the acid number, the styrene-acrylic dispersant can have an acid number from 100 to 350, from 120 to 350, from 150 to 250, from 155 to 185, or about 172, for example. Example commercially available styrene-acrylic dispersants can include JONCRYL® 671, JONCRYL® 71, JONCRYL® 96, JONCRYL® 680, JONCRYL® 683, JONCRYL® 678, JONCRYL® 690, JONCRYL® 296, JONCRYL® 696 or JONCRYL® ECO 675 (all available from BASF Corp.).

The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). Also, in some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. For examples, even if the monomer used to form the polymer was in the form of a (meth)acrylic acid during preparation, pH modifications during preparation or subsequently when added to an inkjet ink can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts.

The following are some example pigment and separate dispersant combinations: a carbon black pigment with a styrene acrylic dispersant; PB 15:3 (cyan pigment) with a styrene acrylic dispersant; PR122 (magenta) or a co-crystal of PR122 and PV19 (magenta) with a styrene acrylic dispersant; or PY74 (yellow) or PY155 (yellow) with a styrene acrylic dispersant.

In an example, the pigment is present in an amount ranging from about 1 wt % active to about 10 wt % active, based on a total weight of the inkjet ink. In another example, the pigment is present in the inkjet ink in an amount ranging from about 1 wt % active to about 6 wt % active of the total weight of the inkjet ink. In still another example, the pigment is present in the inkjet ink in an amount ranging from about 2 wt % active to about 6 wt % active of the total weight of the inkjet ink. When the separate dispersant is used, the separate dispersant may be present in an amount ranging from about 0.05 wt % active to about 6 wt % active of the total weight of the inkjet ink. In some examples, the ratio of pigment to separate dispersant may range from 0.5 (1:2) to 10 (10:1).

Self-Dispersed Pigments

In other examples, the inkjet ink includes a self-dispersed pigment, which includes a pigment and an organic group attached thereto.

Any of the pigments set forth herein may be used, such as carbon, phthalocyanine, quinacridone, azo, or any other type of organic pigment, as long as at least one organic group that is capable of dispersing the pigment is attached to the pigment.

The organic group that is attached to the pigment includes at least one aromatic group, an alkyl (e.g., $C_1$ to $C_{20}$), and an ionic or ionizable group.

The aromatic group may be an unsaturated cyclic hydrocarbon containing one or more rings and may be substituted or unsubstituted, for example with alkyl groups. Aromatic groups include aryl groups (for example, phenyl, naphthyl, anthracenyl, and the like) and heteroaryl groups (for example, imidazolyl, pyrazolyl, pyridinyl, thienyl, thiazolyl, furyl, triazinyl, indolyl, and the like).

The alkyl may be branched or unbranched, substituted or unsubstituted.

The ionic or ionizable group may be at least one phosphorus-containing group, at least one sulfur-containing group, or at least one carboxylic acid group.

In an example, the at least one phosphorus-containing group has at least one P—O bond or P=O bond, such as at least one phosphonic acid group, at least one phosphinic acid group, at least one phosphinous acid group, at least one phosphite group, at least one phosphate, diphosphate, triphosphate, or pyrophosphate groups, partial esters thereof, or salts thereof. By "partial ester thereof", it is meant that the phosphorus-containing group may be a partial phosphonic acid ester group having the formula —$PO_3RH$, or a salt thereof, wherein R is an aryl, alkaryl, aralkyl, or alkyl group. By "salts thereof", it is meant that the phosphorus-containing group may be in a partially or fully ionized form having a cationic counterion.

When the organic group includes at least two phosphonic acid groups or salts thereof, either or both of the phosphonic acid groups may be a partial phosphonic ester group. Also, one of the phosphonic acid groups may be a phosphonic acid ester having the formula —$PO_3R_2$, while the other phosphonic acid group may be a partial phosphonic ester group, a phosphonic acid group, or a salt thereof. In some instances, it may be desirable that at least one of the phosphonic acid groups is either a phosphonic acid, a partial ester thereof, or salts thereof. When the organic group includes at least two phosphonic acid groups, either or both of the phosphonic acid groups may be in either a partially or fully ionized form. In these examples, either or both of the phosphonic acid groups have the formula —$PO_3H_2$, —$PO_3H^-M^+$ (monobasic salt), or —$PO_3^{-2}M^{+2}$ (dibasic salt), wherein $M^+$ is a cation such as $Na^+$, $K^+$, $Li^+$, or $NR_4^+$, wherein R, which can be the same or different, represents hydrogen or an organic group such as a substituted or unsubstituted aryl and/or alkyl group.

As other examples, the organic group may include at least one geminal bisphosphonic acid group, partial esters thereof, or salts thereof. By "geminal", it is meant that the at least two phosphonic acid groups, partial esters thereof, or salts thereof are directly bonded to the same carbon atom. Such a group may also be referred to as a 1,1-diphosphonic acid group, partial ester thereof, or salt thereof.

An example of a geminal bisphosphonic acid group may have the formula —$CQ(PO_3H_2)_2$, or may be partial esters thereof or salts thereof. Q is bonded to the geminal position and may be H, R, OR, SR, or $NR_2$ wherein R, which can be the same or different when multiple are present, is selected from H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. For examples, Q may be H, R, OR, SR, or $NR_2$, wherein R, which can be the same or different when multiple are present, is selected from H, a $C_1$-$C_6$ alkyl group, or an aryl group. As specific examples, Q is H, OH, or $NH_2$. Another example of a geminal bisphosphonic acid group may have the formula —$(CH_2)_nCQ(PO_3H_2)_2$, or may be partial esters thereof or salts thereof, wherein Q is as described above and n is 0 to 9, such as 1 to 9. In some specific examples, n is 0 to 3, such as 1 to 3, or n is either 0 or 1.

Still another example of a geminal bisphosphonic acid group may have the formula —X—$(CH_2)_nCQ(PO_3H_2)_2$, or may be partial esters thereof or salts thereof, wherein Q and n are as described above and X is an arylene, heteroarylene, alkylene, vinylidene, alkarylene, aralkylene, cyclic, or heterocyclic group. In specific examples, X is an arylene group, such as a phenylene, naphthalene, or biphenylene group, which may be further substituted with any group, such as one or more alkyl groups or aryl groups. When X is an alkylene group, examples include substituted or unsubstituted alkylene groups, which may be branched or unbranched and can be substituted with one or more groups, such as aromatic groups. Examples of X include $C_1$-$C_{12}$ groups like methylene, ethylene, propylene, or butylene. X may be directly attached to the pigment, meaning there are no additional atoms or groups from the attached organic group between the pigment and X. X may also be further substituted with one or more functional groups. Examples of functional groups include R', OR', COR', COOR', OCOR', carboxylates, halogens, CN, $NR'_2$, $SO_3H$, sulfonates, sulfates, NR'(COR'), $CONR'_2$, imides, $NO_2$, phosphates, phosphonates, N=NR', SOR', $NR'SO_2R'$, and $SO_2NR'_2$, wherein R', which can be the same or different when multiple are present, is independently selected from hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

Yet another example of a geminal bisphosphonic acid group may have the formula —X-Sp-$(CH_2)_nCQ(PO_3H_2)_2$, or may be partial esters thereof or salt thereof, wherein X, Q, and n are as described above. "Sp" is a spacer group, which, as used herein, is a link between two groups. Sp can be a bond or a chemical group. Examples of chemical groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR''$—, —O—, —S—, —NR''—, —NR''CO—, —CONR''—, —NR''$CO_2$—, —$O_2$CNR''—, —NR''CONR''—, —N(COR'')CO—, —CON(COR'')—, —NR''COCH($CH_2CO_2R''$)— and cyclic imides therefrom, —NR''COCH$_2$CH($CO_2R''$)— and cyclic imides therefrom, —CH(CH$_2$CO$_2$R'')CONR''— and cyclic imides therefrom, —CH(CO$_2$R'')CH$_2$CONR'' and cyclic imides therefrom (including phthalimide and maleimides of these), sulfonamide groups (including —SO$_2$NR''— and —NR''SO$_2$— groups), arylene groups, alkylene groups and the like. R'', which can be the same or different when multiple are included, represents H or an organic group such as a substituted or unsubstituted aryl or alkyl group. In the example formula —X-Sp-(CH$_2$)$_n$CQ(PO$_3$H$_2$)$_2$, the two phosphonic acid groups or partial esters or salts thereof are bonded to X through the spacer group Sp. Sp may be —$CO_2$—, —$O_2C$—, —O—, —NR''—, —NR''CO—, or —CONR''—, —SO$_2$NR''—, —SO$_2$CH$_2$CH$_2$NR''—, —SO$_2$CH$_2$CH$_2$O—, or —SO$_2$CH$_2$CH$_2$S— wherein R'' is H or a $C_1$-$C_6$ alkyl group.

Still a further example of a geminal bisphosphonic acid group may have the formula —N—[(CH$_2$)$_m$(PO$_3$H$_2$)]$_2$, partial esters thereof, or salts thereof, wherein m, which can be the same or different, is 1 to 9. In specific examples, m is 1 to 3, or 1 or 2. As another example, the organic group may include at least one group having the formula —(CH$_2$)n-N—[(CH$_2$)$_m$(PO$_3$H$_2$)]$_2$, partial esters thereof, or salts thereof, wherein n is 0 to 9, such as 1 to 9, or 0 to 3, such as 1 to 3, and m is as defined above. Also, the organic group may include at least one group having the formula —X—(CH$_2$)$_n$—N—[(CH$_2$)$_m$(PO$_3$H$_2$)]$_2$, partial esters thereof, or salts thereof, wherein X, m, and n are as described above, and, in an example, X is an arylene group. Still further, the organic group may include at least one group having the formula —X-Sp-(CH$_2$)$_n$—N—[(CH$_2$)$_m$PO$_3$H$_2$)]$_2$, partial esters thereof, or salts thereof, wherein X, m, n, and Sp are as described above.

Yet a further example of a geminal bisphosphonic acid group may have the formula —CR═C(PO$_3$H$_2$)$_2$, partial esters thereof, or salts thereof. In this example, R can be H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. In an example, R is H, a $C_1$-$C_6$ alkyl group, or an aryl group.

The organic group may also include more than two phosphonic acid groups, partial esters thereof, or salts thereof, and may, for example include more than one type of group (such as two or more) in which each type of group includes at least two phosphonic acid groups, partial esters thereof, or salts thereof. For example, the organic group may include a group having the formula —X—[CQ(PO$_3$H$_2$)$_2$]$_p$, partial esters thereof, or salts thereof. In this example, X and Q are as described above. In this formula, p is 1 to 4, e.g., 2.

In addition, the organic group may include at least one vicinal bisphosphonic acid group, partial ester thereof, or salts thereof, meaning that these groups are adjacent to each other. Thus, the organic group may include two phosphonic acid groups, partial esters thereof, or salts thereof bonded to adjacent or neighboring carbon atoms. Such groups are also sometimes referred to as 1,2-diphosphonic acid groups, partial esters thereof, or salts thereof. The organic group including the two phosphonic acid groups, partial esters thereof, or salts thereof may be an aromatic group or an alkyl group, and therefore the vicinal bisphosphonic acid group may be a vicinal alkyl or a vicinal aryl diphosphonic acid group, partial ester thereof, or salts thereof. For example, the organic group may be a group having the formula —$C_6H_3$—(PO$_3$H$_2$)$_2$, partial esters thereof, or salts thereof, wherein the acid, ester, or salt groups are in positions ortho to each other.

In other examples, the ionic or ionizable group (of the organic group attached to the pigment) is a sulfur-containing group. The at least one sulfur-containing group has at least one S═O bond, such as a sulfinic acid group or a sulfonic acid group. Salts of sulfinic or sulfonic acids may also be used, such as —SO$_3^-$X$^+$, where X is a cation, such as Na$^+$, H$^+$, K$^+$, NH$_4^+$, Li$^+$, Ca$^{2+}$, Mg$^+$, etc.

When the ionic or ionizable group is a carboxylic acid group, the group may be COOH or a salt thereof, such as —COO$^-$X$^+$, —(COO$^-$X$^+$)$_2$, or —(COO$^-$X$^+$)$_3$.

Examples of the self-dispersed pigments are commercially available as dispersions. Suitable commercially available self-dispersed pigment dispersions include those of the CAB-O-JET® 200 Series, manufactured by Cabot Corporation. Some specific examples include CAB-O-JET® 200 (black pigment), CAB-O-JET® 250C (cyan pigment), CAB-O-JET® 260M or 265M (magenta pigment) and CAB-O-JET® 270 (yellow pigment)). Other suitable commercially available self-dispersed pigment dispersions include those of the CAB-O-JET® 400 Series, manufactured by Cabot Corporation. Some specific examples include CAB-O-JET® 400 (black pigment), CAB-O-JET® 450C (cyan pigment), CAB-O-JET® 465M (magenta pigment) and CAB-O-JET® 470Y (yellow pigment)). Still other suitable commercially available self-dispersed pigment dispersions include those of the CAB-O-JET® 300 Series, manufactured by Cabot Corporation. Some specific examples include CAB-O-JET® 300 (black pigment) and CAB-O-JET® 352K (black pigment).

The self-dispersed pigment may be present in an amount ranging from about 1 wt % active to about 10 wt % active based on a total weight of the inkjet ink. In an example, the self-dispersed pigment is present in an amount ranging from about 1 wt % active to about 6 wt % active based on a total weight of the inkjet ink. In another example, the self-dispersed pigment is present in an amount ranging from about 2 wt % active to about 5 wt % active based on a total weight of the inkjet ink. In yet another example, the self-dispersed pigment is present in an amount of about 3 wt % based on the total weight of the inkjet ink. In still another example, the self-dispersed pigment is present in an amount of about 5 wt % active based on the total weight of the inkjet ink.

Polymeric Binder

The inkjet ink also includes a polymeric binder. Examples of the polymeric binder are selected from the group consisting of a polyester-polyurethane binder, a polyether-polyurethane binder, and a polycarbonate-polyurethane binder.

In an example, the inkjet ink includes the polyester-polyurethane binder. In an example, the polyester-polyurethane binder is a sulfonated polyester-polyurethane binder. The sulfonated polyester-polyurethane binder can include diaminesulfonate groups. In an example, the polymeric binder is the polyester-polyurethane binder, the polyester-polyurethane binder is a sulfonated polyester-polyurethane binder, and is one of: i) an aliphatic compound including multiple saturated carbon chain portions ranging from $C_4$ to $C_{10}$ in length, and that is devoid of an aromatic moiety, or ii)

an aromatic compound including an aromatic moiety and multiple saturated carbon chain portions ranging from $C_4$ to $C_{10}$ in length.

In one example, the sulfonated polyester-polyurethane binder can be anionic. In further detail, the sulfonated polyester-polyurethane binder can also be aliphatic, including saturated carbon chains as part of the polymer backbone or as a side-chain thereof, e.g., $C_2$ to $C_{10}$, $C_3$ to $C_8$, or $C_3$ to $C_6$ alkyl. These polyester-polyurethane binders can be described as "alkyl" or "aliphatic" because these carbon chains are saturated and because they are devoid of aromatic moieties. An example of an anionic aliphatic polyester-polyurethane binder that can be used is IMPRANIL® DLN-SD (CAS #375390-41-3; Mw 133,000; Acid Number 5.2; Tg −47° C.; Melting Point 175-200° C.) from Covestro. Example components used to prepare the IMPRANIL® DLN-SD or other similar anionic aliphatic polyester-polyurethane binders can include pentyl glycols (e.g., neopentyl glycol); $C_4$ to $C_{10}$ alkyldiol (e.g., hexane-1,6-diol); $C_4$ to $C_{10}$ alkyl dicarboxylic acids (e.g., adipic acid); $C_4$ to $C_{10}$ alkyl diisocyanates (e.g., hexamethylene diisocyanate (HDI)); diamine sulfonic acids (e.g., 2-[(2-aminoethyl)amino]ethanesulfonic acid); etc.

Alternatively, the sulfonated polyester-polyurethane binder can be aromatic (or include an aromatic moiety) and can include aliphatic chains. An example of an aromatic polyester-polyurethane binder that can be used is DISPERCOLL® U42 (CAS #157352-07-3). Example components used to prepare the DISPERCOLL® U42 or other similar aromatic polyester-polyurethane binders can include aromatic dicarboxylic acids, e.g., phthalic acid; $C_4$ to $C_{10}$ alkyl dialcohols (e.g., hexane-1,6-diol); $C_4$ to $C_{10}$ alkyl diisocyanates (e.g., hexamethylene diisocyanate (HDI)); diamine sulfonic acids (e.g., 2-[(2-aminoethyl)amino]ethanesulfonic acid); etc.

Other types of polyester-polyurethanes can also be used, including IMPRANIL® DL 1380, which can be somewhat more difficult to jet from thermal inkjet printheads compared to IMPRANIL® DLN-SD and DISPERCOLL® U42, but still can be acceptably jetted in some examples, and can also provide acceptable washfastness results on a variety of fabric types.

The polyester-polyurethane binders disclosed herein may have a weight average molecular weight (Mw, g/mol or Daltons) ranging from about 20,000 to about 300,000. In some examples of the inkjet ink, the polymeric binder is the polyester-polyurethane binder, and the polyester-polyurethane binder has a weight average molecular weight ranging from about 20,000 Mw to about 300,000 Mw. As examples, the weight average molecular weight can range from about 50,000 to about 500,000, from about 100,000 to about 400,000, or from about 150,000 to about 300,000.

The polyester-polyurethane binders disclosed herein may have an acid number that ranges from about 1 mg KOH/g to about 50 mg KOH/g. In some examples of the inkjet ink, the polymeric binder is the polyester-polyurethane binder, and the polyester-polyurethane binder has an acid number that ranges from about 1 mg KOH/g to about 50 mg KOH/g. As other examples, the acid number of the polyester-polyurethane binder can range from about 1 mg KOH/g to about 200 mg KOH/g, from about 2 mg KOH/g to about 100 mg KOH/g, or from about 3 mg KOH/g to about 50 mg KOH/g. For this binder, the term "acid number" refers to the mass of potassium hydroxide (KOH) in milligrams that is used to neutralize one gram of the polyester-polyurethane binder.

To determine this acid number, a known amount of a sample of the polyester-polyurethane binder may be dispersed in water and the aqueous dispersion may be titrated with a polyelectrolyte titrant of a known concentration. In this example, a current detector for colloidal charge measurement may be used. An example of a current detector is the MUtek PCD-05 Smart Particle Charge Detector (available from BTG). The current detector measures colloidal substances in an aqueous sample by detecting the streaming potential as the sample is titrated with the polyelectrolyte titrant to the point of zero charge. An example of a suitable polyelectrolyte titrant is poly(diallyldimethylammonium chloride) (i.e., PolyDADMAC).

The average particle size of the polyester-polyurethane binders disclosed herein may range from about 20 nm to about 500 nm. As examples, the sulfonated polyester-polyurethane binder can have an average particle size ranging from about 20 nm to about 500 nm, from about 50 nm to about 350 nm, or from about 100 nm to about 350 nm. The particle size of any solids herein, including the average particle size of the dispersed polymer binder, can be determined using a NANOTRAC® Wave device, from Microtrac, e.g., NANOTRAC® Wave II or NANOTRAC® 150, etc., which measures particles size using dynamic light scattering. Average particle size can be determined using particle size distribution data generated by the NANOTRAC® Wave device.

Other examples of the inkjet ink include a polyether-polyurethane binder. Examples of polyether-polyurethanes that may be used include IMPRANIL® LP DSB 1069, IMPRANIL® DLE, IMPRANIL® DAH, or IMPRANIL® DL 1116 (Covestro (Germany)); or HYDRAN® WLS-201 or HYDRAN® WLS-201K (DIC Corp. (Japan)); or TAKELAC® W-6061T or TAKELAC® WS-6021 (Mitsui (Japan)).

Still other examples of the inkjet ink include a polycarbonate-polyurethane binder. Examples of polycarbonate-polyurethanes that may be used as the polymeric binder include IMPRANIL® DLC-F or IMPRANIL® DL 2077 (Covestro (Germany)); or HYDRAN® WLS-213 (DIC Corp. (Japan)); or TAKELAC® W-6110 (Mitsui (Japan)).

In some examples of the inkjet ink, the polymeric binder is present in an amount ranging from about 2 wt % active to about 15 wt % active, based on a total weight of the inkjet ink. In another example, the polymeric binder can be present, in the inkjet ink, in an amount ranging from about 2 wt % active to about 10 wt % active based on the total weight of the inkjet ink.

The polymeric binder (prior to being incorporated into the inkjet ink) may be dispersed in water alone or in combination with an additional water soluble or water miscible co-solvent, such as those described for the pigment dispersion. It is to be understood however, that the liquid components of the binder dispersion become part of the aqueous liquid vehicle in the thermally curable inkjet ink.

Liquid Vehicles

In addition to the pigment and the polymeric binder, the inkjet ink includes a liquid vehicle. In some examples, the inkjet ink further comprises an additive selected from the group consisting of a non-ionic or an anionic surfactant, an anti-kogation agent, an antimicrobial agent, an anti-decel agent, and combinations thereof.

As used herein, the term "liquid vehicle" may refer to the liquid with which the pigment (dispersion) and polymeric binder (dispersion) are mixed to form a thermal or a piezoelectric inkjet ink(s). A wide variety of vehicles may be used with the inkjet ink(s) of the present disclosure. The liquid vehicle may include water and any of: a co-solvent, an anti-kogation agent, an anti-decel agent, a surfactant, an antimicrobial agent, a pH adjuster, or combinations thereof. In an example of the inkjet ink, the liquid vehicle includes water and a co-solvent. In another example, the liquid vehicle consists of water and the co-solvent, the anti-kogation agent, the anti-decel agent, the surfactant, the antimicrobial agent, a pH adjuster, or a combination thereof. In still another example, the liquid vehicle consists of the anti-kogation agent, the anti-decel agent, the surfactant, the antimicrobial agent, a pH adjuster, and water.

The liquid vehicle may include co-solvent(s). The co-solvent(s) may be present in an amount ranging from about 4 wt % to about 30 wt % (based on the total weight of the inkjet ink). In an example, the liquid vehicle includes glycerol. Other examples of co-solvents include alcohols, aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of alcohols may include ethanol, isopropyl alcohol, butyl alcohol, and benzyl alcohol. Other specific examples include 2-ethyl-2-(hydroxymethyl)-1, 3-propane diol (EPHD), dimethyl sulfoxide, sulfolane, and/or alkyldiols such as 1,2-hexanediol.

The co-solvent may also be a polyhydric alcohol or a polyhydric alcohol derivative. Examples of polyhydric alcohols may include ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol. Examples of polyhydric alcohol derivatives may include an ethylene oxide adduct of diglycerin.

The co-solvent may also be a nitrogen-containing solvent. Examples of nitrogen-containing solvents may include 2-pyrrolidone, 1-(2-hydroxyethyl)-2-pyrrolidone, N-methyl-2-pyrrolidone, cyclohexylpyrrolidone, and triethanolamine.

An anti-kogation agent may also be included in the liquid vehicle of a thermal inkjet composition. Kogation refers to the deposit of dried ink on a heating element of a thermal inkjet printhead. Anti-kogation agent(s) is/are included to assist in preventing the buildup of kogation. In some examples, the anti-kogation agent may improve the jettability of the inkjet ink. The anti-kogation agent may be present in the inkjet ink in an amount ranging from about 0.1 wt % active to about 1.5 wt % active, based on the total weight of the inkjet ink. In an example, the anti-kogation agent is present in an amount of about 0.5 wt % active, based on the total weight of the inkjet ink.

Examples of suitable anti-kogation agents include oleth-3-phosphate (commercially available as CRODAFOS™ O3A or CRODAFOS™ N-3A) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

The liquid vehicle may include anti-decel agent(s). The anti-decel agent may function as a humectant. Decel refers to a decrease in drop velocity over time with continuous firing. In the examples disclosed herein, the anti-decel agent(s) is/are included to assist in preventing decel. In some examples, the anti-decel agent may improve the jettability of the inkjet ink. The anti-decel agent(s) may be present in an amount ranging from about 0.2 wt % active to about 5 wt % active (based on the total weight of the inkjet ink). In an example, the anti-decel agent is present in the inkjet ink in an amount of about 1 wt % active, based on the total weight of the inkjet ink.

An example of a suitable anti-decel agent is ethoxylated glycerin having the following formula:

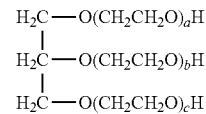

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

The liquid vehicle of the inkjet ink may also include surfactant(s). In any of the examples disclosed herein, the surfactant may be present in an amount ranging from about 0.01 wt % active to about 5 wt % active (based on the total weight of the inkjet ink). In an example, the surfactant is present in the inkjet ink in an amount ranging from about 0.05 wt % active to about 3 wt % active, based on the total weight of the inkjet ink.

The surfactant may include anionic and/or non-ionic surfactants. Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

In some examples, the liquid vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® 440 (an ethoxylated low-foam wetting agent) SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.); and BYK® 345, BYK® 346, BYK® 347, BYK® 348, BYK® 349 (each of which is a silicone surfactant) (all of which are available from BYK Chemie).

The liquid vehicle may also include antimicrobial agent(s). Antimicrobial agents are also known as biocides and/or fungicides. In an example, the total amount of antimicrobial agent(s) in the inkjet ink ranges from about 0.01 wt % active to about 0.05 wt % active (based on the total weight of the inkjet ink). In another example, the total amount of antimicrobial agent(s) in the inkjet ink is about 0.044 wt % active (based on the total weight of the inkjet ink). In some instances, the antimicrobial agent may be present in the pigment dispersion that is mixed with the liquid vehicle.

Examples of suitable antimicrobial agents include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

The liquid vehicle may also include a pH adjuster. A pH adjuster may be included in the inkjet ink to achieve a desired pH (e.g., 8.5) and/or to counteract any slight pH drop that may occur over time. In an example, the total amount of pH adjuster(s) in the inkjet ink ranges from greater than 0 wt % to about 0.1 wt % (based on the total weight of the inkjet ink). In another example, the total amount of pH adjuster(s) in the inkjet ink about 0.03 wt % (based on the total weight of the inkjet ink).

Examples of suitable pH adjusters include metal hydroxide bases, such as potassium hydroxide (KOH), sodium hydroxide (NaOH), etc. In an example, the metal hydroxide base may be added to the inkjet ink in an aqueous solution. In another example, the metal hydroxide base may be added to the inkjet ink in an aqueous solution including 5 wt % of the metal hydroxide base (e.g., a 5 wt % potassium hydroxide aqueous solution).

Suitable pH ranges for examples of the inkjet ink can be from pH 7 to pH 11, from pH 7 to pH 10, from pH 7.2 to pH 10, from pH 7.5 to pH 10, from pH 8 to pH 10, 7 to pH 9, from pH 7.2 to pH 9, from pH 7.5 to pH 9, from pH 8 to pH 9, from 7 to pH 8.5, from pH 7.2 to pH 8.5, from pH 7.5 to pH 8.5, from pH 8 to pH 8.5, from 7 to pH 8, from pH 7.2 to pH 8, or from pH 7.5 to pH 8.

The balance of the inkjet ink is water. In an example, deionized water may be used. The water included in the inkjet ink may be: i) part of the polycarbodiimide dispersion, pigment dispersion, and/or binder dispersion, ii) part of the liquid vehicle, iii) added to a mixture of the polycarbodiimide dispersion, pigment dispersion, and/or binder dispersion and the liquid vehicle, or iv) a combination thereof. In examples where the inkjet ink is a thermal inkjet ink, the liquid vehicle includes at least 70% by weight of water. In examples where the inkjet ink is a piezoelectric inkjet ink, the liquid vehicle is a solvent based vehicle including at least 50% by weight of the co-solvent.

One specific example of the inkjet ink includes the polycarbodiimide in an amount ranging from about 0.1 wt % active to about 10 wt % active based on the total weight of the inkjet ink; the pigment in an amount ranging from about 1 wt % active to about 10 wt % active based on the total weight of the inkjet ink; the polymeric binder in an amount ranging from about 2 wt % active to about 15 wt % active of the total weight of the inkjet ink; a styrene acrylic dispersant; an additive selected from the group consisting of a non-ionic surfactant, an anti-kogation agent, an antimicrobial agent, an anti-decel agent, and combinations thereof; and the liquid vehicle, which includes water and an organic solvent (e.g., the co-solvent disclosed herein).

Textile Fabrics

In an example of printing method (shown in FIG. 1) and for use in an example of a printing system (shown in FIG. 2), the textile fabric is selected from the group consisting of polyester fabrics, polyester blend fabrics, cotton fabrics, cotton blend fabrics, nylon fabrics, nylon blend fabrics, silk fabrics, silk blend fabrics, and combinations thereof. In a further example, textile fabric is selected from the group consisting of cotton fabrics and cotton blend fabrics.

It is to be understood that organic textile fabrics and/or inorganic textile fabrics may be used for the textile fabric. Some types of fabrics that can be used include various fabrics of natural and/or synthetic fibers. It is to be understood that the polyester fabrics may be a polyester coated surface. The polyester blend fabrics may be blends of polyester and other materials (e.g., cotton, linen, etc.). In another example, the textile fabric may be selected from nylons (polyamides) or other synthetic fabrics.

Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the textile fabric/substrate can include polymeric fibers such as nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E.I. du Pont de Nemours and Company, Delaware), fiberglass, polytrimethylene, polycarbonate, polyethylene terephthalate, polyester terephthalate, polybutylene terephthalate, or a combination thereof. In some examples, the fiber can be a modified fiber from the abovelisted polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

It is to be understood that the terms "textile fabric" or "fabric substrate" do not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into finished articles (e.g., clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of multiple processes.

Textile Printing Kit

The textile fabric and the inkjet ink described herein may be part of a textile printing kit. In an example, the textile printing kit comprises a i) textile fabric; and ii) an inkjet ink, including: a polycarbodiimide; a pigment; a polymeric binder selected from the group consisting of a polyester-polyurethane binder, a polyether-polyurethane binder, and a polycarbonate-polyurethane binder; and a liquid vehicle. It is to be understood that any example of the inkjet ink may be used in the examples of the textile printing kit. It is to be understood that any example of the textile fabric may be used in the examples of the textile printing kit.

Printing Method and System

FIG. 1 depicts an example of the printing method 100. As shown in FIG. 1, an example the printing method 100 comprises: generating a print by thermal inkjet printing an inkjet ink directly onto a textile fabric selected from the group consisting of cotton, polyester, nylon, and silk, the inkjet ink including: a polycarbodiimide; a pigment; a polymeric binder selected from the group consisting of a polyester-polyurethane binder, a polyether-polyurethane binder, and a polycarbonate-polyurethane binder; and a liquid vehicle (as shown at reference numeral 102); and thermally curing the print (as shown at reference numeral 104).

It is to be understood that any example of the inkjet ink may be used in the examples of the method 100. It is to be understood that any example of the textile fabric may be used in the examples of the method 100.

As shown in reference numerals 102 in FIG. 1, the method 100 includes thermal inkjet printing the inkjet ink directly onto the textile fabric. As such, no pre-treatment composition is applied on the textile fabric before the inkjet ink is printed.

In some examples, multiple inkjet inks may be thermal inkjet printed onto the textile fabric. In these examples, each of the inkjet inks may include an example of the polycarbodiimide, the pigment, the polymeric binder, and the liquid vehicle. However, each of the inkjet inks may include a pigment so that a different color (e.g., cyan, magenta, yellow, black, violet, green, brown, orange, purple, white, etc.) is generated by each of the inkjet inks. As an example, a combination of two or more inkjet inks selected from the group consisting of a cyan ink, a magenta ink, a yellow ink, and a black ink may be thermal inkjet printed onto the textile fabric.

In other examples, a single inkjet ink may be thermal inkjet printed onto the textile fabric.

The inkjet ink(s) may be thermal inkjet printed in a single pass or in multiple passes. As an example of single pass printing, the cartridge(s) of a thermal inkjet printer deposit(s) the desired amount of the inkjet ink(s) during the same pass of the cartridge(s) across the textile fabric. As an example of multiple pass printing, the cartridge(s) of a thermal inkjet printer deposit the desired amount of the inkjet ink(s) over several passes of the cartridge(s) across the textile fabric.

As shown in reference numeral 104 in FIG. 1, the method 100 includes thermally curing the print. The thermally curing of the print may be accomplished be applying heat to the print. In an example of the method 100, the thermal curing involves heating the print to a temperature ranging from about 80° C. to about 200° C., for a period of time ranging from about 10 seconds to about 15 minutes. In another example, the temperature ranges from about 100° C. to about 180° C. In still another example, thermal curing is achieved by heating the print to a temperature of 150° C. for about 3 minutes.

Referring now to FIG. 2, a schematic diagram of a printing system 10 including thermal inkjet printhead 14 in a printing zone 18 of the printing system 10 and a dryer 20 positioned in a fixation zone 22 of the printing system 10.

In one example, a textile fabric/substrate 24 may be transported through the printing system 10 along the path shown by the arrows such that the textile fabric 24 is first fed to the printing zone 18. In the printing zone 18, the textile fabric 24 is transported through an ink zone 28 where an example of the inkjet ink 34 is thermal inkjet printed directly onto the textile fabric 24 by the thermal inkjet printhead 14 to generate a print.

The textile fabric 24 (having the inkjet ink printed thereon) may then be transported to the curing zone 22 where the inkjet ink/print is heated to cure the print. The heat is sufficient to bind the pigment onto the textile fabric 24. The heat to initiate curing may range from about 80° C. to about 200° C. The curing of the ink/print forms the printed article 40 including the image 38 formed on the textile fabric 24.

To further illustrate the present disclosure, an example is given herein. It is to be understood that this example is provided for illustrative purposes and is not to be construed as limiting the scope of the present disclosure.

Example

Two examples of the inkjet ink disclosed herein were prepared. The example polycarbodiimide included in the first example inkjet ink was DESMODUR® XP 2802 from Covestro. The example polycarbodiimide included in the second example inkjet ink was CARBODILITE® E05 from Nisshinbo Chemical Inc. The example pigment dispersion included in each of the example inkjet inks was a cyan pigment dispersion including a cyan pigment (pigment color index (C.I.) classification of PB15:3) and a styrene acrylic dispersant (dispersant weight average molecular weight (MW, in Daltons) of 8,000, and the dispersant acid number (in mg KOH/g) of 185). The example sulfonated polyester-polyurethane binder included in each of the example inkjet inks was IMPRANIL® DLN-SD (CAS #375390-41-3; Mw 133,000; Acid Number 5.2; Tg −47° C.; Melting Point 175-200° C.) from Covestro.

Each example inkjet ink had the same general formulation except for the type of polycarbodiimide (as noted above). The general formulation of the example inkjet inks is shown in Table 1, with the wt % active of each component that was used. For example then, the weight percentage of the polycarbodiimide represents the total polycarbodiimide solids (i.e., wt % active polycarbodiimide) present in the final ink formulations. In other words, the amount of the polycarbodiimide added to the example inkjet inks was enough to achieve a polycarbodiimide solids level equal to the given weight percent. Similarly, the weight percentage of the pigment dispersion represents the total pigment solids (i.e., wt % active pigment) present in the final ink formulations, and the weight percentage of the binder represents the total binder solids (i.e., wt % active binder) present in the final ink formulations. Additionally, a 5 wt % potassium hydroxide aqueous solution was added to each of the example inkjet inks until a pH of about 8.5 was achieved.

TABLE 1

| Ingredient | Specific Component | First example inkjet ink (wt %) | Second example inkjet ink (wt %) |
|---|---|---|---|
| Polycarbodiimide | DESMODUR ® XP 2802 | 2 | — |
| | CARBODILITE ® E05 | — | 2 |
| Pigment dispersion | Cyan pigment dispersion | 2.5 | 2.5 |
| Binder | IMPRANIL ® DLN-SD | 6 | 6 |
| Co-solvent | Glycerol | 8 | 8 |
| Anti-decel agent | LIPONIC ® EG-1 | 1 | 1 |
| Anti-kogation agent | CRODAFOS ™ N-3A | 0.5 | 0.5 |
| Surfactant | SURFYNOL ® 440 | 0.3 | 0.3 |
| Antimicrobial agent | ACTICIDE ® B20 | 0.044 | 0.044 |
| Water | Deionized water | Balance | Balance |

Each of the example inkjet inks was tested for stability. Each example inkjet ink was stored in an accelerated storage (AS) environment at a temperature of 60° C. for one week. The particle size for each example inkjet ink was measured before and after the ink formulations were stored in the AS environment. The particle size for each example inkjet ink was measured in terms of the volume-weighted mean diameter (Mv) and the D95 (i.e., 95% the population is below this value) using dynamic light scattering with a NANOTRAC® WAVE™ particle size analyzer (available from MICROTRAC™—NIKKISO GROUP™). Then the percent change in particle size was calculated for each example inkjet ink. The particle size for each example inkjet ink before and after one week in the AS environment and the results of the particle size change calculations are shown in Table 2.

TABLE 2

| Inkjet ink | Particle size before AS (Mv, μm) | Particle size after 1 wk AS (Mv, μm) | Particle size change after 1 wk AS (Mv, %) | Particle size before AS (D95, μm) | Particle size after 1 wk AS (D95, μm) | Particle size change after 1 wk AS (D95, %) |
|---|---|---|---|---|---|---|
| First example inkjet ink | 0.107 | 0.099 | −7.5 | 0.216 | 0.185 | −14.3 |
| Second example inkjet ink | 0.106 | 0.101 | −4.6 | 0.236 | 0.179 | −24.3 |

Additionally, the pH, viscosity (VIS), and surface tension (ST) of each of the example inkjet inks were measured before and after the ink formulations were stored in the AS environment. Then the change (Δ) in the pH and the percent change in each of the viscosity and the ST were calculated for each example inkjet ink. The pH, viscosity, and ST for each example inkjet ink before and after one week in the AS environment and the results of the size change calculations are shown in Table 3.

TABLE 3

| Inkjet ink | pH before AS | pH after 1 wk AS | ΔpH after 1 wk AS | VIS before AS (cp) | VIS after 1 wk AS (cp) | ΔVIS after 1 wk AS (%) | ST before AS (mN/m) | ST after 1 wk AS (mN/m) | ΔST after 1 wk AS (%) |
|---|---|---|---|---|---|---|---|---|---|
| First example inkjet ink | 9.09 | 9.08 | −0.01 | 2.4 | 2.1 | −12.5 | 36.74 | 36.54 | −0.5 |
| Second example inkjet ink | 9.60 | 9.86 | 0.26 | 2.3 | 2.0 | −13.0 | 35.47 | 35.35 | −0.3 |

Each example inkjet ink was also put through a T-cycle. During the T-cycle, each example inkjet ink was heated to and maintained at a high temperature of 70° C. for 4 hours, and then each example inkjet ink was cooled to and maintained at a low temperature of −40° C. for 4 hours. This process was repeated for each example inkjet ink for 5 cycles. For each example inkjet ink, the particle size (in terms of Mv and D95) was measured before and after the T-cycle, and the percent change in particle size was calculated. The particle size for each example inkjet ink before and after the T-cycle and the results of the particle size change calculations are shown below in Table 4.

TABLE 4

| Inkjet ink | Particle size before T-cycle (Mv, μm) | Particle size after T-cycle (Mv, μm) | Particle size change after T-cycle (Mv, %) | Particle size before T-cycle (D95, μm) | Particle size after T-cycle (D95, μm) | Particle size change after T-cycle (D95, %) |
|---|---|---|---|---|---|---|
| First example inkjet ink | 0.107 | 0.098 | −8.4 | 0.216 | 0.195 | −9.8 |
| Second example inkjet ink | 0.106 | 0.101 | −4.4 | 0.236 | 0.182 | −23.2 |

The results shown in Tables 2, 3, and 4 indicate that the polycarbodiimide does not react with the sulfonated polyester-polyurethane binder in the example inkjet inks. The results shown in Tables 2, 3, and 4 also indicate that the stability of the example inkjet inks is suitable for inkjet printing.

Several example prints were generated by thermal inkjet printing using the example inkjet inks before and after one week in the AS environment. For each example print, the amount of the example inkjet ink printed was 20 grams per square meter (gsm). Example prints were generated on 100% untreated cotton with both the first and second example inks, and example prints were generated on a 65% polyester/35% cotton blend with the second example ink. No pre-treatment was performed on any of the fabrics before generating the example prints. Each example print was cured at 150° C. for 3 minutes.

Optical Density

The initial optical density (initial OD) of each print was measured. Then, each print was washed 5 times in a Kenmore 90 Series Washer (Model 110.289 227 91) with warm water (at about 40° C.) and detergent. Each print was allowed to air dry between each wash. Then, the optical density (OD after 5 washes) of each print was measured, and the percent change in optical density (% Δ OD) was calculated for each print.

OD—Untreated Cotton Results

The initial optical density (initial OD), the optical density after 5 washes (OD after 5 washes), and the percent change in optical density (% Δ in OD) of each print generated on untreated cotton are shown in Table 5. In Table 5, each print is identified by the inkjet ink used to generate the print.

TABLE 5

(Untreated Cotton)

| Inkjet ink used to generate the print | Initial OD | OD after 5 washes | % Δ in OD |
|---|---|---|---|
| First example inkjet ink before AS | 1.138 | 1.098 | −3.6 |
| Second example inkjet ink before AS | 1.125 | 1.107 | −1.6 |
| First example inkjet ink after 1 wk AS | 1.104 | 1.048 | −5.0 |
| Second example inkjet ink after 1 wk AS | 1.115 | 1.121 | 0.5 |

As shown in Table 5, each print had an initial optical density greater than 1.1 and an optical density after 5 washes greater than 1. As also shown in Table 5, the change in optical density was 5% or less for each of the prints. The results shown in Table 5 indicate that the prints generated on gray cotton with an example inkjet ink (before or after one week in the AS environment) had good initial optical density, good optical density after 5 washes, and an acceptable change in optical density.

OD—65% Polyester/35% Cotton Blend Results

The initial optical density (initial OD), the optical density after 5 washes (OD after 5 washes), and the percent change in optical density (% Δ in OD) of each print generated on the 65% polyester/35% cotton blend are shown in Table 6. In Table 6, each print is identified by the inkjet ink used to generate the print.

TABLE 6

(65% Polyester/35% Cotton Blend)

| Inkjet ink used to generate the print | Initial OD | OD after 5 washes | % Δ in OD |
|---|---|---|---|
| Second example inkjet ink before AS | 1.144 | 1.103 | −3.5 |
| Second example inkjet ink after 1 wk AS | 1.113 | 1.056 | −5.1 |

As shown in Table 6, each print had an initial optical density greater than 1.1 and an optical density after 5 washes greater than 1. As also shown in Table 6, the change in optical density was about 5% or less for each of the prints. The results shown in Table 6 indicate that the prints generated on the 65% polyester/35% cotton blend with the second example inkjet ink (before or after one week in the AS environment) had good initial optical density, good optical density after 5 washes, and an acceptable change in optical density.

Washfastness

Each print was also tested for washfastness. The L*a*b* values of a color (e.g., cyan, magenta, yellow, black, red, green, blue, white) before and after the 5 washes were measured. L* is lightness, a* is the color channel for color opponents green-red, and b* is the color channel for color opponents blue-yellow. The color change was then calculated using both the CIEDE1976 color-difference formula and the CIEDE2000 color-difference formula.

The CIEDE1976 color-difference formula is based on the CIELAB color space. Given a pair of color values in CIELAB space $L^*_1$, $a^*_1$, $b^*_1$ and $L^*_2$, $a^*_2$, $b^*_2$, the CIEDE1976 color difference between them is as follows:

$$\Delta E_{76} = \sqrt{[(L^*_2 - L^*_1)^2 + (a^*_2 - a^*_1)^2 + (b^*_2 - b^*_1)^2]}$$

It is noted that $\Delta E_{76}$ is the commonly accepted notation for CIEDE1976.

The CIEDE2000 color-difference formula is based on the CIELAB color space. Given a pair of color values in CIELAB space $L^*_1$, $a^*_1$, $b^*_1$ and $L^*_2$, $a^*_2$, $b^*_2$, the CIEDE2000 color difference between them is as follows:

$$\Delta E_{00}(L_1^*, a_1^*, b_1^*; L_2^*, a_2^*, b_2^*) = \Delta E_{00}^{12} = \Delta E_{00} \qquad (1)$$

It is noted that $\Delta E_{00}$ is the commonly accepted notation for CIEDE2000.

Given two CIELAB color values $\{L_i^*, a_i^*, b_i^*\}_{i=1}^2$ and parametric weighting factors $k_L$, $k_C$, $k_H$, the process of computation of the color difference is summarized in the following equations, grouped as three main parts.

1. Calculate $C'_i$, $h'_i$:

$$C^*_{i,ab} = \sqrt{((a_i^*)^2 + (b_i^*)^2)}, \; i = 1, 2 \qquad (2)$$

$$\overline{C}^*_{ab} = \frac{C^*_{1,ab} + C^*_{2,ab}}{2} \qquad (3)$$

$$G = 0.5\left(1 - \sqrt{\frac{\overline{C}^{*7}_{ab}}{\overline{C}^{*7}_{ab} + 25^7}}\right) \qquad (4)$$

$$a'_i = (1+G)a_i^*, i=1,2 \qquad (5)$$

$$C'_i = \sqrt{((a'_i)^2 + (b'_i)^2)}, \; i = 1, 2 \qquad (6)$$

$$h'_i = \begin{cases} 0 & b_i^* = a'_i = 0 \\ \tan^{-1}(b_i^*, a'_i) & \text{otherwise} \end{cases}, \; i = 1, 2 \qquad (7)$$

2. Calculate $\Delta L'$, $\Delta C'$, $\Delta H'$:

$$\Delta L' = L_2^* - L_1^* \qquad (8)$$

$$\Delta C' = C_2^* - C_1^* \qquad (9)$$

$$\Delta h' = \begin{cases} 0 & C'_1 C'_2 = 0 \\ h'_2 - h'_1 & C'_1 C'_2 \neq 0; |h'_2 - h'_1| \leq 180° \\ (h'_2 - h'_1) - 360 & C'_1 C'_2 \neq 0; (h'_2 - h'_1) > 180° \\ (h'_2 - h'_1) + 360 & C'_1 C'_2 \neq 0; (h'_2 - h'_1) < -180° \end{cases} \qquad (10)$$

$$\Delta H' = 2\sqrt{C'_1 C'_2} \sin\left(\frac{\Delta h'}{2}\right) \qquad (11)$$

3. Calculate CIEDE2000 Color-Difference $\Delta E_{00}$:

$$\overline{L}' = (L_1^* + L_2^*)/2 \qquad (12)$$

$$\overline{C}' = (C'_1 + C'_2)/2 \qquad (13)$$

$$\overline{h}' = \begin{cases} \frac{h'_1 + h'_2}{2} & |h'_1 - h'_2| \leq 180°; C'_1 C'_2 \neq 0 \\ \frac{h'_1 + h'_2 + 360°}{2} & |h'_1 - h'_2| > 180°; (h'_1 + h'_2) < 360°; C'_1 C'_2 \neq 0 \\ \frac{h'_1 + h'_2 - 360°}{2} & |h'_1 - h'_2| > 180°; (h'_1 + h'_2) \geq 360°; C'_1 C'_2 \neq 0 \\ (h'_1 + h'_2) & C'_1 C'_2 = 0 \end{cases} \qquad (14)$$

$$T = 1 - 0.17 \cos(\overline{h}' - 30°) + 0.24 \cos(2\overline{h}') + 0.32 \cos(3\overline{h}' + 6°) - 0.20 \cos(4\overline{h}' - 63°) \qquad (15)$$

$$\Delta\theta = 30 \exp\left\{-\left[\frac{\overline{h}' - 275°}{25}\right]^2\right\} \qquad (16)$$

$$R_c = 2\sqrt{\frac{\overline{C}'^7}{\overline{C}'^7 + 25^7}} \qquad (17)$$

$$S_L = 1 + \frac{0.015(\overline{L}' - 50)^2}{\sqrt{20 + (\overline{L}' - 50)^2}} \qquad (18)$$

$$S_C = 1 + 0.045\overline{C}' \quad (19)$$

$$S_H = 1 + 0.015\overline{C}'T \quad (20)$$

$$R_T = -\sin(2\Delta\theta)R_C \quad (21)$$

$$\Delta E_{00}^{12} = \Delta E_{00}(L_1^*, a_1^*, b_1^*; L_2^*; L_2^*, a_2^*, b_2^*) = \sqrt{\left(\left(\frac{\Delta L'}{k_L S_L}\right)^2 + \left(\frac{\Delta C'}{k_C S_C}\right)^2 + \left(\frac{\Delta H'}{k_H S_H}\right)^2 + R_T\left(\frac{\Delta C'}{k_C S_C}\right)\left(\frac{\Delta H'}{k_H S_H}\right)\right)} \quad (22)$$

Washfastness—Untreated Cotton Results

The results of the $\Delta E_{76}$ calculations and the $\Delta E_{00}$ calculations for each print generated on untreated cotton are shown in Table 7. In Table 7, each print is identified by the inkjet ink used to generate the print.

TABLE 7

(Untreated Cotton)

| Inkjet ink used to generate the print | ΔE76 | ΔE00 |
|---|---|---|
| First example inkjet ink before AS | 3.09 | 1.92 |
| Second example inkjet ink before AS | 3.36 | 1.70 |
| First example inkjet ink after 1 wk AS | 2.44 | 1.80 |
| Second example inkjet ink after 1 wk AS | 1.62 | 0.55 |

As shown in Table 7, the $\Delta E_{76}$ value of each print was less than 4. As also shown in Table 7, the $\Delta E_{00}$ value of each print was less than 2. These results indicate that the prints generated on untreated cotton with an example inkjet ink (before or after one week in the AS environment) had good washfastness.

Washfastness—65% Polyester/35% Cotton Blend Results

The results of the $\Delta E_{76}$ calculations and the $\Delta E_{00}$ calculations for each print generated on the 65% polyester/35% cotton blend are shown in Table 8. In Table 8, each print is identified by the inkjet ink used to generate the print.

TABLE 8

(65% Polyester/35% Cotton Blend)

| Inkjet ink used to generate the print | ΔE76 | ΔE00 |
|---|---|---|
| Second example inkjet ink before AS | 4.65 | 2.68 |
| Second example inkjet ink after 1 wk AS | 1.91 | 1.54 |

As shown in Table 8, the $\Delta E_{76}$ value of each print was less than 5. As also shown in Table 8, the $\Delta E_{00}$ value of each print was less than 3. These results indicate that the prints generated on the 65% polyester/35% cotton blend with the second example inkjet ink (before or after one week in the AS environment) had good washfastness.

It is to be understood that the ranges provided herein include the stated range and any value or sub-range within the stated range, as if the value(s) or sub-range(s) within the stated range were explicitly recited. For example, a range from about 0.1 wt % active to about 10 wt % active, should be interpreted to include not only the explicitly recited limits of from about 0.1 wt % active to about 10 wt % active, but also to include individual values, such as about 1.15 wt % active, about 2.5 wt % active, 4.0 wt % active, 6.77 wt % active, 8.85 wt % active, 9.33 wt % active, etc., and sub-ranges, such as from about 1 wt % active to about 5.65 wt % active, from about 3 wt % active to about 7 wt % active, from about 4.35 wt % active to about 8.95 wt % active, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An inkjet ink for textile printing, the inkjet ink comprising:
   a polycarbodiimide;
   a pigment;
   a polymeric binder selected from the group consisting of a polyester-polyurethane binder, a polyether-polyurethane binder, and a polycarbonate-polyurethane binder; and
   a liquid vehicle.

2. The inkjet ink as defined in claim 1 wherein the polycarbodiimide has a weight average molecular weight ranging from 1,500 Mw to 150,000 Mw.

3. The inkjet ink as defined in claim 1 wherein the polycarbodiimide is present in an amount ranging from about 0.1 wt % active to about 10 wt % active, based on a total weight of the inkjet ink.

4. The inkjet ink as defined in claim 1 wherein the pigment is present in an amount ranging from about 1 wt % active to about 10 wt % active, based on a total weight of the inkjet ink.

5. The inkjet ink as defined in claim 1 wherein the polymeric binder is present in an amount ranging from about 2 wt % active to about 15 wt % active, based on a total weight of the inkjet ink.

6. The inkjet ink as defined in claim 1 wherein the polymeric binder is the polyester-polyurethane binder, and wherein the polyester-polyurethane binder is a sulfonated polyester-polyurethane binder, and wherein the sulfonated polyester-polyurethane binder is one of:
  i) an aliphatic compound including multiple saturated carbon chain portions ranging from $C_4$ to $C_{10}$ in length, and that is devoid of an aromatic moiety; or
  ii) an aromatic compound including an aromatic moiety and multiple saturated carbon chain portions ranging from $C_4$ to $C_{10}$ in length.

7. The inkjet ink as defined in claim 1 wherein the polymeric binder is the polyester-polyurethane binder, and wherein the polyester-polyurethane binder has a weight average molecular weight ranging from about 20,000 Mw to about 300,000 Mw.

8. The inkjet ink as defined in claim 1 wherein the polymeric binder is the polyester-polyurethane binder, and wherein the polyester-polyurethane binder has an acid number ranging from about 1 mg KOH/g to about 50 mg KOH/g.

9. The inkjet ink as defined in claim 1 wherein the liquid vehicle includes water and a co-solvent.

10. The inkjet ink as defined in claim 1, further comprising a styrene acrylic polymeric dispersant.

11. The inkjet ink as defined in claim 1, further comprising an additive selected from the group consisting of a non-ionic or an anionic surfactant, an anti-kogation agent, an antimicrobial agent, an anti-decel agent, and combinations thereof.

12. A textile printing kit, comprising:
  i) a textile fabric; and
  ii) an inkjet ink, including:
    a polycarbodiimide;
    a pigment;
    a polymeric binder selected from the group consisting of a polyester-polyurethane binder, a polyether-polyurethane binder, and a polycarbonate-polyurethane binder; and
    a liquid vehicle.

13. The textile printing kit as defined in claim 12 wherein the textile fabric is selected from the group consisting of polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof.

14. A printing method, comprising:
  generating a print by thermal inkjet printing an inkjet ink directly onto a textile fabric selected from the group consisting of cotton, polyester, nylon, and silk, the inkjet ink including:
    a polycarbodiimide;
    a pigment;
    a polymeric binder selected from the group consisting of a polyester-polyurethane binder, a polyether-polyurethane binder, and a polycarbonate-polyurethane binder; and
    a liquid vehicle; and
  thermally curing the print.

15. The printing method as defined in claim 14 wherein the thermal curing involves heating the print to a temperature ranging from about 80° C. to about 200° C., for a period of time ranging from about 10 seconds to about 15 minutes.

* * * * *